United States Patent Office 3,437,657
Patented Apr. 8, 1969

3,437,657
6-FLUOROMETHYL-3-OXO-4,6-DIENIC STEROIDS AND PROCESS FOR PREPARING SAME
Bernard Ellis, Peter Feather, Hugh MacBride, and Vladimir Petrow, London, England, assignors to The British Drug Houses Limited
No Drawing. Filed Dec. 17, 1965, Ser. No. 514,676
Claims priority, application Great Britain, Dec. 21, 1964, 51,946/64
Int. Cl. C07c *169/30, 169/34;* A61k *17/00*
U.S. Cl. 260—239.55          2 Claims

ABSTRACT OF THE DISCLOSURE

New 6-fluoromethyl-3-oxo-4,6-dienic steroids of the pregnane series are disclosed. They are prepared by direct reaction of a corresponding 6-hydroxymethyl-3-oxo-4,6-dienic steroid with a fluorinating agent. The compounds of the invention may possess progestational, ovulation-inhibiting, and gonadotrophin-inhibiting properties.

This invention is for improvements in or relating to organic compounds and has particular reference to steroidal compounds containing a fluoromethyl substituent at $C_6$.

It is an object of the present invention to provide a novel and general process for the preparation of 6-fluoromethyl-3-oxo-4,6-dienic and 6-fluoromethyl-3-oxo-1,4,6-trienic steroids, including the partial Formula I below.

Many of the 6-fluoromethyl-3-oxo-4,6-dienic and 6-fluoromethyl-3-oxo-1,4,6-trienic steroids of the present invention possess valuable biological properties. Thus, for example, the derivatives of 17β-hydroxyandrostane which fall within the scope of the present invention may possess anabolic, androgenic, gonadotrophin-inhibting and claudogenic properties. The derivatives of 17α-acyloxypregnan-20-one which fall within the scope of the present invention may possess progestational, ovulation-inhibiting and gonadotrophin-inhibiting properties. In conjunction with an oestrogen such for example as ethynyloestradiol, mestranol, 17α-chlorethynyl (17α-bromoethynyl) oestradiol and its 3-methyl and 3,17-dimethyl ether, 17α-trifluoropropynyl oestradiol and its 3-methyl and 3,17-dimethyl ether, 17α-trifluorovinyl oestradiol and its 3-methyl and 3,17-dimethyl ether, the compounds of the present invention and in particular 17α-acetoxy-6-fluoromethyl-pregna-4,6-diene-3,20-dione and its 1-dehydro derivative and the 16-methylene analogues thereof are of value as oral contraceptives and as anti-tumor agents in experimental assays. In addition, the compounds are of value in veterinary work for the synchronisation of oestrus and for inhibition of ovulation. Such formulations may be administered as pills, tablets and other standard pharmaceutical formulations either in the conventional 20 days/month regimens or in sequential or serial regimens. The progestationally active 17α-acyloxypregnan-20-one derivatives are of value in various gynecological disorders such as dysmenorrhea, in endometriosis, disfuctional uterine bleeding, premenstrual tension syndrome, the postponement of normal menstruation, primary and secondary amenorrhea, sub-fertility and inhibition of lactation, and may be administered in standard pharmaceutical formulations for these purposes. The derivatives of 16α, 17α-isopropylidenedioxypregnan - 20 - one and analogues thereof which fall within the present invention may likewise show progestational activity, anti-inflammatory activity and anti-endotoxic activtiy. Glucocorticoid activity may be shown by the derivatives of 11β,17α,21-trihydroxypregnan-3,20-dione and 17α,21-dihydroxypregnane-3,11,20-trione and by the 21-acyl and 17,21-diacyl derivatives thereof, and their 16-methyl, 16-halo, 16-methylene, 16-halomethylene and 16-halomethyl derivatives particularly where there is additionally a 9α-fluoro substituent and a $\Delta^{1,4,6}$-trienic system present.

The present invention provides new 6-fluoromethyl-3-oxo-1,4,6-trienic steroids including the partial Formula I below.

The invention also provides 6-fluoromethyl-3-oxo-4,6-dienic steroids of the androstane, 19-norandrostane and 19-norpregnane series including the partial Formula I below.

The invention further provides 6-fluoromethyl-3-oxo-4,6-dienic steroids of the pregnane series having the following formulae:

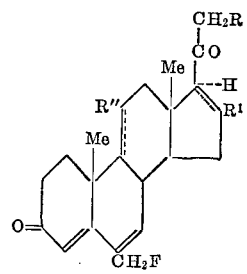

where:

R is H, Me, or a halogen atom,
R' is H, Me, CN or $CH_2OH$,
R" is H or =O

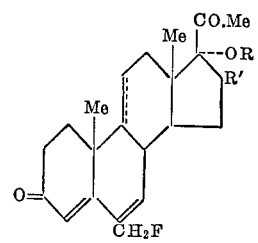

where:

R is H or a lower acyl group containing up to 6 carbon atoms,
R' is =$CH_2$, Me, or a halogen atom or = CH.Me or =CHX or $CH_2X$ where X is a halogen atom

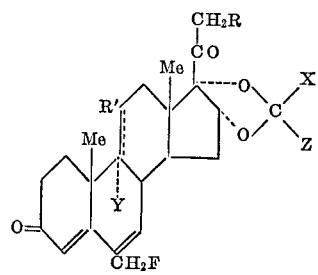

where:

R is H, OH, or a lower acyl group containing up to 6 carbon atoms, or a halogen atom,
R' is H, β—OH or =O
Y is H or F,
X is H, or an alkyl or aryl group, and Z is an alkyl or aryl group or where X and Z together form a ring

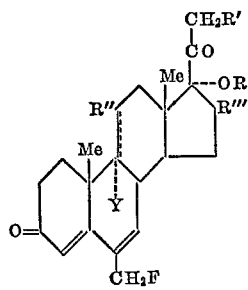

where:

R is H or a lower acyl group containing up to 6 carbon atoms,
R' is OH, a lower acyloxy group containing up to 6 carbon atoms or a halogen atom,
R" is H, β—OH or =O,
R''' is H, Me, =CH₂, α—OH, a halogen atom, or CH₂X or =CHX where X is a halogen atom,
Y is H or F

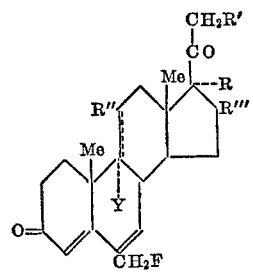

where:

R is a lower alkyl group containing up to 4 carbon atoms,
R' is H, OH, a lower acyloxy group containing up to 6 carbon atoms, or a halogen atom,
R" is H, β—OH or =O,
R''' is H, Me, =CH₂, α—OH, a halogen atom, or CH₂X or =CHX where X is a halogen atom,
Y is H or F.

The invention provides the following new compounds:

17β - acetoxy - 6-fluoromethylandrosta-4,6-dien-3-one which has anabolic and androgenic properties.

17β - acetoxy-6-fluoromethylandrosta-1,4,6-trien-3-one which has anabolic and androgenic properties.

17β - acetoxy - 6-fluoromethyl-19-norandrosta-4,6-dien-3-one which has claudogenic properties.

17α - acetoxy-6-fluoromethylpregna-1,4,6-triene-3,20-dione which has progestational, anti-ovulatory and gonadotrophin-inhibiting properties.

17α - acetoxy-6-fluoromethyl-16-methylenepregna-4,6-diene-3,20-dione, which has progestational, anti-endotoxic and anti-ovulatory properties.

17α - acetoxy-6-fluoromethyl-16-methylenepregna-1,4,6-triene-3,20-dione which has progestational, anti-endotoxic and anti-ovulatory properties.

21 - acetoxy - 6-fluoromethyl-17α-hydroxypregna-4,6-diene-3,11,20-trione and the Δ¹-derivative thereof which have glucocorticoid, anti-inflammatory and anti-endotoxic properties.

21 - acetoxy - 6-fluoromethyl-11β,17α-dihydroxypregna-4,6-diene-3,20-dione and the Δ¹-derivative thereof which have glucocorticoid, anti-inflammatory and ant-endotoxic properties.

6 - fluoromethyl - 16α,17α-isopropylidenedioxypregna-4,6-diene-3,20-dione and the Δ¹-derivative thereof which have anti-inflammatory properties.

According to the present invention there is provided a process for the preparation of 6-fluoromethyl-3-oxo-4,6-dienic and 6-fluoro-methyl-3-oxo-1,4,6-trienic steroids including the partial formula

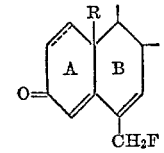 (I)

where R is H or Me, which process comprises treating a 6-hydroxymethyl-3-oxo-4,6-dienic steroid including the partial formula

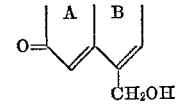 (II)

with a fluorinating agent to give the corresponding 6-fluoromethyl-3-oxo-4,6-dienic steroid, and if desired dehydrogenating to give the corresponding 6-fluoromethyl-3-oxo-1,4,6-trienic steroid.

Conversion of 6-hydroxymethyl-3-oxo-4,6-dienic steroids into the corresponding 6-fluoromethyl-3-oxo-4,6-dienic steroids may be effected by employing fluorinating agents under carefully regulated conditions. The preferred fluorinating agent is 2-chloro-1,1,2-trifluorotriethylamine, but other fluorinating agents such as sulphur tetrafluoride fall within the purview of the present invention.

In a preferred form of the invention, the 6-hydroxymethyl-3-oxo-4,6-dienc steroid (II) in a suitable dry inert organic solvent such for example as diethylene glycol dimethyl ether, or an halogenated hydrocarbon such as methylene dichloride or chloroform, is treated at temperatures preferably in the region of 0° to 25° C. with not less than one molecular proportion of 2-chloro-1,1,2-trifluorotriethylamine. The reaction is generally rapid. It may be allowed to proceed during 30 minutes or longer, after which the product is isolated by techniques well-known to those skilled in the art, and purified by crystallisation, or by chromatography followed by crystallisation. The 6-fluoromethyl-3-oxo-4,6-dienic steroid so obtained may be converted into the corresponding 6-fluoromethyl-3-oxo-1,4,6-trienic steroid by 1-dehydrogenation, employing for example 2,3-dichloro-5,6-dicyanobenzoquinone but other dehydrogenating agents such as selenium dioxide fall within the purview of the present invention. In a preferred form of the invention, the 6-fluoromethyl-3-oxo-4,6-dienic steroid and not less than one molecular proportion of 2,3-dichloro-5,6-dicyanobenzoquinone are heated together in a suitable inert organic solvent, until reaction is complete. Benzene may be employed as organic solvent when, at reflux temperature, reaction is complete generally within 10 to 20 hours. Thereafter, the product is isolated by satndard techniques, and purified to give the required 6-fluoromethyl-3-oxo-1,4,6-trienic steroid.

The 6-hydroxymethyl-3-oxo-4,6-dienic steroids (II) employed as starting materials in the present invention are described in our pending application 457,522 filed May 20, 1965, now issued as Patent No. 3,375,167. They are prepared by dehydrogenation, for example with 2,3-dichloro-5,6-dicyanobenzoquinone in aqueous acetone of 3-alkoxy-6-hydroxymethyl-3,5-dienic steroids which may be additionally substituted by Hydroxyl groups: In various positions in the steroid molecule. In general such hydroxyl groups are preferably protected by acylation. Experimental conditions, however, can generally be so adapted as to avoid reaction of the fluorinating agent with 17α-hydroxy groups in pregnan-20-one derivatives and with 11β-hydroxy groups.

Acyloxy groups in such positions as 11, 12, 16 (including 16-acyloxymethyl), 14, 15, 17, 18, 19, 20, 21 (including the condensation products of 16α, 17α-glycols with carbonyl components).

Carbony groups such for example as carbonyl groups at $C_{11}$, $C_{12}$, $C_{15}$, $C_{16}$, $C_{17}$, $C_{18}$ and $C_{20}$.

Carbalkoxy groups at $C_{13}$, $C_{16}$, $C_{17}$, $C_{20}$ or in the side-chain.

Cyano groups at $C_{13}$, $C_{16}$, $C_{17}$.

Alkyl groups in particular Me groups at $C_2$, $C_{11}$, $C_{16}$, $C_{17}$, $C_{18}$, $C_{21}$ and ethyl at $C_{17}$.

Alkenyl and alkynyl groups in particular vinyl and allyl, trifluoropropynyl, trifluorovinyl, ethynyl, propynyl and chlorethynyl at $C_{17}$.

Methylene, halomethylene and ethylidene groups at $C_{11}$, $C_{16}$ and $C_{17}$.

Groups such as benzylidene at $C_{21}$; methylene, halo- and carboxy methylene at $C_{16}$:$C_{17}$.

Lactone, ether and spiroketal residues: Spirolactone residues such as —O.CO.CH$_2$.CH$_2$— attached to $C_{17}$, etheric groups at $C_{16}$, and bridging $C_{18}$ and $C_{20}$, spiroketal moieties such as are present in diosgenone, 20,20-ethylene-dioxy groups, 17,17-ethylene-dioxy groups and similar functional derivatives.

Halogen groups and in particular chlorine and fluorine at $C_9$, $C_{11}$, $C_{16}$ and $C_{21}$. Halomethyl at $C_{16}$.

Unsaturated linkages in particular at $C_{9(11)}$, $C_{11}$, $C_{14}$, $C_{16}$ and $C_{17(20)}$.

Cortical side chains, both acylated, or converted into such "protected" derivatives as bismethylenedioxy, cyclic-carbonates, cyclic acetonides or orthoformates.

Epoxides and halohydrins particularly at $C_{16-17}$.

The process of the invention may be applied to the 6 - hydroxymethyl - 3 - oxo-4,6-dienic compounds derived from the following steroids or their acyl derivatives:

testosterone and 19-nor derivatives thereof
2-methyltestosterone and 19-nor derivatives thereof
17α-methyltestosterone and 19-nor derivatives thereof
9(11)-dehydro-17α-methyltestosterone and 19-nor derivatives thereof
17α-propynyltestosterone, 17α-chlorethynyl, 17α-trifluoropropynyl, 17α-trifluorovinyl testosterone and 19-nor derivatives thereof
17α-acyloxyprogesterones and 19-nor derivatives thereof
9(11)-dehydro-17α-acyloxyprogesterones
16-methyl-17α-acyloxyprogesterones, 16-halomethyl-17α-acyloxy-progesterones
9(11)-dehydro-16-methyl-17α-acyloxyprogesterones
16-methylene-17α-acyloxyprogesterones, 16-halomethylene-17α-acyloxyprogesterones
9(11)-dehydro-16-methylene-17α-acyloxyprogesterones
17α-acyloxy-16-ethylideneprogesterones
16α,17α-dimethylmethylenedioxyprogesterone
9(11)-dehydro-16α,17α-dimethylmethylenedioxyprogesterone cortisone
16-methylcortisone, 16-halomethylcortisone and the 21-fluoro derivatives thereof
21-methylcortisone and the 21-fluoro derivatives thereof
16-methylenecortisone, 16-halomethylenecortisone and the 21-fluoro derivatives thereof
16α-hydroxy cortisone and the (16α, 17α)-acetonide thereof
hydrocortisone
16-methylhydrocortisone, 16-halomethylhydrocortisone and the 21-fluoro derivatives thereof
21-methylhydrocortisone and the 21-fluoro derivatives thereof
16-methylenehydrocortisone, 16-halomethylenehydrocortisone and the 21-fluoro derivatives thereof
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione 16α-hydroxy,17α,21-dihydroxypregna-4,9(11)-diene-3,20-dione and the (16,17)-acetonide thereof
21-fluoro-16α,17α-dihydroxypregna-4,9(11)-diene-3,20-dione and the (16,17)-acetonide thereof
21-fluoro-16α,17α-dihydroxypregna-4-ene-3,11,20-trione and the (16,17)-acetonide thereof
21-fluoro-11,16α,17α-trihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)dehydro-21-hydroxypregna-4,17-dien-3-one
3-oxopregna-4,17-dien-21-oic acid (esters)
3,11-dioxopregna-4,17-dien-21-oic acid (esters)
11-hydroxy-3-oxopregna-4,17-dien-21-oic acid (esters)
9(11)-dehydro-3-oxopregna-4,17-dien-21-oic acid (esters)
21-fluoro-17α-acyloxyprogesterones
progesterone
16-methylprogesterone
11-oxoprogesterone
9(11)-dehydroprogesterone
21-methylprogesterone
diosgenone
17α-cyano-17β-hydroxyandrost-4-en-3-one
16 (α and β)-hydroxytestosterone and 19-nor derivatives
16-methyl-16,17-dehydroprogesterone
16-cyano-progesterone
16-carbalkoxyprogesterones
16-hydroxymethylprogesterone
3-(3-oxo-17β-hydroxyandrost-4-en-17α-yl)propionic acid
21-fluoroprogesterone
testololactone
16-fluoro-corticoids The 9α-fluoro derivatives of the above 11β-hydroxy and 11-oxo-steroids.

Following is a description by way of example of methods of carrying the invention into effect.

Example 1.—17α-acetoxy-6-fluoromethyl-16-methylene-pregna-4,6-diene-3,20-dione

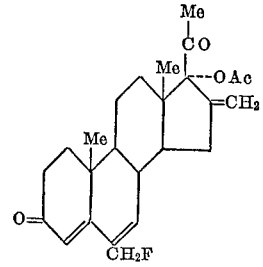

17α - acetoxy - 6 - hydroxymethyl - 16 - methylene-pregna-4,6-diene-3,20-dione (3 g.) in chloroform (10 ml.) at 0° C. was treated dropwise with 2-chloro-1,1,2-trifluorotriethylamine (3 g.). After a further 5 minutes at 0° C., the mixture was allowed to stand for 20 minutes at room temperature. Chloroform (150 ml.) was added, and the solution washed successively with dilute hydrochloric acid, dilute aqueous sodium bicarbonate and water. The solution was dried, the solvent was removed, and the solid residue leached four times with small quantities of ether. The insoluble fraction was crystallise from acetone to give 17α - acetoxy - 6 - fluoromethyl - 16 - methylene-pregna - 4,6 - diene - 3,20 - dione, - short needles, M.P. 234° C., (decomp.), $[\alpha]_D^{24}$ —125° (in chloroform)

$\lambda_{max.}^{EtOH}$ 277 mµ (ε, 25,500), $\nu_{max.}^{CCl_4}$ 1744, 1720, 1711 (inflection), 1676, 1670 and 1634, and $\nu_{max.}^{Nujol}$ 1260, 1244, 1040, 965 and 890 cm$^{-1}$

Example 2.—17α-acetoxy-6-fluoromethylpregna-4,6-diene-3,20-dione

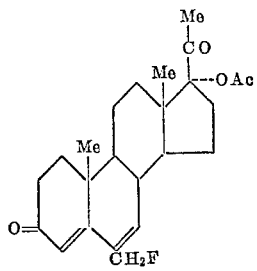

17α - acetoxy - 6 - hydroxymethylpregna - 4,6 - diene-3,20-dione (370 mg.) in dry chloroform (2 ml.) at room temperature was treated with 2-chloro-1,1,2-trifluorotriethylamine (0.5 g.) added dropwise during 2 minutes. The mixture was allowed to stand for 2 hours, and the product, isolated with ether, was chromatographed on silica gel (20 g.). Material eluted with benzene-ether mixtures (9:1 to 1:1) was crystallised from ethanol to give 17α-acetoxy-6 - fluoromethylpregna - 4,6 - diene - 3,20 - dione, needles, M.P. 200° C., $[\alpha]_D^{25}$ +8.5° (in chloroform), $$\lambda_{max.}^{EtOH} \text{ 278 m}\mu \text{ } (\epsilon, \text{ 24,800}),$$

$$\nu_{max.}^{CCl_4}$$

1741, 1720, 1676 (inflection), 1669 and 1632, and $$\nu_{max.}^{CS_2}$$

1255, 1245, 1055 and 960 cm.⁻¹.

Example 3.—17β-acetoxy-6-fluoromethylandrosta-4,6-dien-3-one

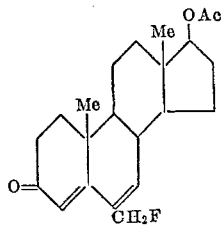

17β - acetoxy - 6 - hydroxymethylandrosta - 4,6 - dien-3-one (2.6 g.) in dry dichloromethane (2.6 ml.) was treated at room temperature with 2-chloro-1,1,2-trifluorotriethylamine (2.5 g.), and the mixture allowed to stand for 2 hours. The product, isolated with dichloromethane, was chromatographed on silica gel (100 g.), and the material eluted with benzene-ether mixtures (9:1 to 3:1) was purified from ethanol to give 17β-acetoxy-6-fluoromethylandrosta-4,6-dien-3-one, small prisms, M.P. 138–140° C., $[\alpha]_D^{28}$ +34° (in chloroform), $$\lambda_{max.}^{EtOH} \text{ 278 m}\mu \text{ } (\epsilon, \text{ 23,900}), \nu_{max.}^{CCl_4}$$

1741, 1668, 1633 and $$\nu_{max.}^{CS_2}$$

1265, 1245 and 1050 cm.⁻¹.

Example 4.—17β-acetoxy-6-fluoromethyl-19-norandrosta-4,6-dien-3-one

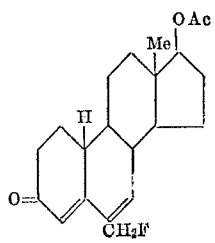

17β - acetoxy - 6 - hydroxymethyl -19 - norandrosta-4,6-dien-3-one (0.3 g.) in dry chloroform (4 ml.) was treated with 2-chloro-1,1,2-trifluorotriethylamine (2 ml.), and the mixture set aside for 1 hour at room temperature. After addition of ether (50 ml.), the solution was washed with water, aqueous sodium bicarbonate, water and then dried. The residue obtained on removal of the solvents was chromatographed on alumina, elution with benzene giving material which crystallised from ether. 17β - acetoxy - 6 - fluoromethyl - 19 - norandrosta - 4,6-dien-3-one separated in needles, M.P. 158° C., $$\lambda_{max.}^{EtOH} \text{ 278 m}\mu \text{ } (\epsilon. \text{ 24,300}), \nu_{max.}^{CCl_4}$$

1741, 1674 and 1634, and $$\nu_{max.}^{CS_2}$$

1240, 1045, 1020 and 883 cm.⁻¹.

Example 5.—21-acetoxy-6-fluoromethyl-17α-hydroxypregna-4,6-diene-3,11,20-trione

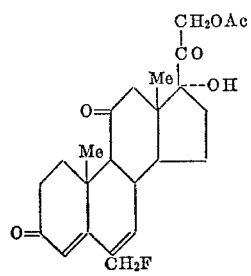

21 - acetoxy - 17α - hydroxy - 6 - hydroxymethylpregna-4,6-diene-3,11,20-trione (0.5 g.) suspended in chloroform (2 ml.) at 0° C., was treated with 2-chloro-1,1,2-trifluorotriethylamine (0.7 g.) added dropwise during 2 minutes. The mixture was allowed to stand for 45 minutes at room temperature, and the product was isolated with chloroform. I twas chromatographed on silica gel (25 g.), elution with benzene-ether (4:1 to 1:1) giving material which was crystallised from ethanol. 21-acetoxy - 6 - fluoromethyl - 17α - hydroxypregna - 4,6-diene - 3,11,20 - trione had M.P. 215.5° C., $[\alpha]_D^{24}$ +264° (in chloroform), $$\lambda_{max.}^{EtOH} \text{ 276 m}\mu \text{ } (\epsilon, \text{ 23,200}), \nu_{max.}^{CH_2Cl_2}$$

3592, 1749, 1730, 1711, 1652, 1634 and 1585, and $$\nu_{max.}^{Nujol}$$

1260, 1240 and 1045 cm.⁻¹.

Example 6.—21-acetoxy-11β,17α-dihydroxy-6-fluoromethylpregna-4,6-diene-3,20-dione

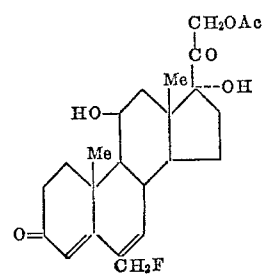

21 - acetoxy - 11β,17α - dihydroxy - 6 - hydroxymethylpregna-4,6-diene-3,20-dione (0.5 g.) in chloroform (2.5 ml.) at 0° C., was treated with 2-chloro-1,1,2-trifluorotriethylamine (0.7 g.) added dropwise during 2 minutes. The mixture was allowed to stand for 30 minutes at room temperature, after which the product was isolated with chloroform and chromatographed on silica gel (25 g.).

Elution with benzene-ether (5:1 to 1:1) gave material which was crystallised from ethanol. 21-acetoxy-11β,17α-dihydroxy-6-fluoromethylpregna-4,6-diene-3,20-dione had M.P. 170° C. (slow rate of heating), $\lambda_{max.}^{EtOH}$ 278 mμ

(ε, 21,800) [α]$_D^{23}$ —199° (in chloroform).

Example 7.—17β-acetoxy-6-fluoromethylandrosta-1,4,6-trien-3-one

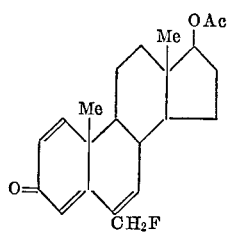

A solution of the product of Example 3, 17β-acetoxy-6-fluoromethylandrosta-4,6-dien-3-one (300 mg.), and 2,3-dichloro-5,6-dicyano-1,4-benzoquinone (300 mg.) in dry benzene (10 ml.) was heated under reflux for 20 hours. The mixture was poured onto alumina (10 g.), and the product eluted with benzene-ether mixtures (3:1 to 1:1). Crystallisation from ethanol gave 17β-acetoxy-6-fluoromethylandrosta-1,4,6-trien-3-one, $\lambda_{max.}^{EtOH}$ 255 mμ

(ε, 10,500) and 290 mμ (ε, 12,000).

Example 8.—6-fluoromethyl-16α,17α-isopropylidenedioxypregna-4,6-diene-3,20-dione

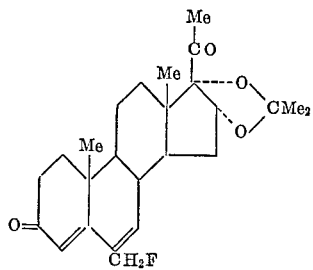

6-hydroxymethyl-16α,17α-isopropylidenedioxypregna-4,6-diene-3,20-dione (1 g.) in dry dichloromethane (3 ml.) was treated at room temperature with 2-chloro-1,1,2-trifluorotriethylamine (2 g.) added dropwise during 2 minutes, and the mixture allowed to stand for 1 hour. The product, isolated with dichloromethane, was chromatographed on silica gel (40 g.), and the material eluted with benzene-ether mixtures (9:1 to 4:1) was purified from ethanol to give 6-fluoromethyl-16α,17α-isopropylidenedioxypregna-4,6-diene-3,20-dione, $\lambda_{max.}$ 278 mμ (ε, 24,200).

Example 9.—17α-acetoxy-6-fluoromethyl-16-methylenepregna-1,4,6-triene-3,20-dione

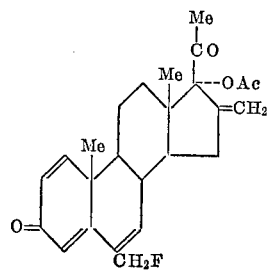

A solution of the product of Example 1, 17α-acetoxy-6-fluoromethyl-16-methylenepregna-4,6-diene-3,20-dione (0.5 g.), and 2,3-dichloro-5,6-dicyano-1,4-benzoquinone (0.5 g.) in dry benzene (10 ml.) was heated under reflux for 20 hours. The mixture was poured onto a column of silica gel (20 g.), and the product eluted with ether. Crystallisation from ethanol gave 17α-acetoxy-6-fluoromethyl-16-methylenepregna-1,4,6-triene-3,20-dione, M.P. 229.5 (decomp.), $\lambda_{max.}^{EtOH}$ 255 mμ

(ε, 10,100) and 290 mμ (ε, 11,600).

Example 10.—Tablets containing 1 mg. of 17α-acetoxy-6-fluoromethyl-16-methylenepregna-4,6-diene-3,20-dione and 0.1 mg. of ethinyloestradiol

|  | Mg. |
|---|---|
| 17α-acetoxy-6-fluoromethyl-16-methylenepregna-4,6-diene-3,20-dione | 1 |
| Ethinyloestradiol | 0.1 |
| Industrial methylated spirit, 66 OP (a sufficient quantity). | |
| Lactose | 107 |
| Starch | 13 |
| Starch paste, 10 percent w./w. (a sufficient quantity). | |
| Magnesium stearate | 1.3 |
| Starch, sufficient to make | 129.6 |

The ethinyloestradiol is dissolved in a suitable quantity of industrial methylated spirit and the 17α-acetoxy-6-fluoromethyl-16-methylenepregna-4,6-diene-3,20-dione mixed with the solution to form a slurry. After addition of the lactose and initial quantity of starch the whole is thoroughly mixed dry and granulated with sufficient 10 percent starch paste. The resultant granules are tray-dried at 50° C., processed through a No. 20 mesh screen and the lubricant (magnesium stearate) added, together with enough starch to produce the required weight. After thorough blending, tablets each weighing 129.6 mg. are compressed using punches of suitable shape and diameter.

Example 11.—O/W emulsified ointment containing 0.25 percent of 21-acetoxy-6-fluoromethyl-17α-hydroxypregna-4,6-diene-3,11,20-trione

|  | G. |
|---|---|
| 21-acetoxy-6-fluoromethyl-17α-hydroxypregna-4,6-diene-3,11,20-trione | 0.25 |
| Cetostearyl alcohol | 11.7 |
| Sodium lauryl sulphate | 1.3 |
| Benzyl alcohol | 1.5 |
| Polyoxyethylene sorbitan monooleate | 0.1 |
| Soft white paraffin | 10.5 |
| Glycerin | 6.0 |
| Purified water, sufficient to make | 100.0 |

The 21-acetoxy-6-fluoremethyl-17α-hydroxypregna-4,6-diene-3,11,20-trione is reduced to an ultra-fine powder either by processing in a fluid energy mill, mechanical mortar and pestle or other suitable means.

The cetostearyl alcohol and soft white paraffin are melted together at 70° C., and the hot mixture strained into a solution of the glycerin and sodium lauryl sulphate in 65 ml. of purified water, also at 70° C. After addition of the benzyl alcohol, the base is allowed to cool with continuous stirring until it begins to set.

A dispersion of the finely powdered 21-acetoxy-6-fluoromethyl-17α-hydroxypregna-4,6-diene-3,11,20-trione is made by wetting it with the polyoxyethylene sorbitan monooleate and the remainder of the water. After the dispersion has been blended with the pre-formed base for 15 minutes, the finished ointment is allowed to set up for 1 hour.

Example 12.—21-acetoxy-6-fluoromethyl-17α-hydroxy-pregna-1,4,6-triene-3,11,20-trione

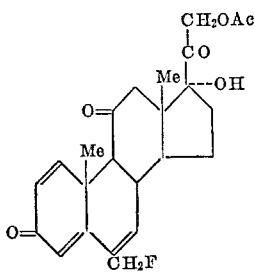

A solution of the product of Example 5, 21-acetoxy-6 - fluoromethyl-17α-hydroxypregna - 4,6-diene - 3,11,20-trione (0.5 g.), and 2,3-dichloro-5,6-dicyano-1,4-benzoquinone (0.5 g.) in dry benzene (15 ml.) was heated under reflux for 20 hours. The mixture was cooled, extracted with dilute aqueous alkali, washed with water and dried. The benzene solution was poured onto a column of silica gel (20 g.), and the product eluted with benzene-ether mixtures (4:1 to 1:1). Crystallisation gave 21-acetoxy-6-fluoromethyl-17α-hydroxy-pregna - 1,4,6-triene-3,11,20-trione, $\lambda_{max.}^{EtOH}$ 255 mμ

(ε, 10,300) and 290 mμ (ε, 11,700).

Example 13.—17α-acetoxy-6-fluoromethylpregna-1,4,6-triene-3,20-dione

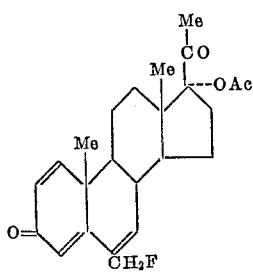

A solution of the product of Example 2, 17α-acetoxy-6-fluoromethylpregna-4,6-diene-3,20-dione (0.5 g.), and 2,3-dichloro-5,6-dicyano-1,4-benzoquinone (0.5 g.) in dry benzene (10 ml.) was heated under reflux for 18 hours. The mixture was poured onto a column of alumina (10 g.), and the product eluted with benzene-ether mixtures (4:1 to 1:1). Crystallisation from methanol gave 17α-acetoxy-6-fluoromethylpregna-1,4,6-triene-3,20-dione, $\lambda_{max.}^{EtOH}$ 255 mμ

(ε, 10,500) and 290 mμ (ε, 11,900).

Example 14.—6-fluoromethyl-16α,17α-isopropylidenedioxypregna-1,4,6-triene-3,20-dione

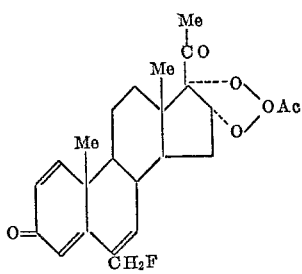

A solution of the product of Example 8, 6-fluoromethyl - 16α,17α - isopropylidenedioxypregna-4,6-diene-3-20-dione (0.4 g.), and 2,3-dichloro-5,6-dicyano-1,4-benzoquinone (0.4 g.) in dry benzene (10 ml.) was heated under reflux for 18 hours. The mixture was poured onto a column of alumina (10 g.), and the product eluted with benzene-ether mixtures (3:1 to 1:1). Crystallisation from ethanol gave 6-fluoromethyl-16α,17α-isopropylidenedioxypregna-1,4,6-triene-3,20-dione $\lambda_{max.}^{EtOH}$ 254 mμ

(ε, 10,400) and 289 mμ (ε, 11,600).

Example 15.—21-acetoxy-11β,17α-dihydroxy-6-fluoromethylpregna-1,4,6-triene-3,20-dione

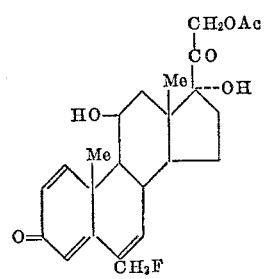

A solution of the product of Example 6, 21-acetoxy-11β,17α - dihydroxy-6-fluoromethylpregna-4,6-diene-3,20-dione (0.5 g.) and 2,3-dichloro-5,6-dicyano-1,4-benzoquinone (0.5 g.) in dry benzene (10 ml.) was heated under reflux for 18 hours. The cooled mixture was washed with dilute aqueous alkali, then with water and dried. It was poured onto a column of silica gel (18 g.), and the product eluted with benzene-ether mixtures (5:1 to 1:1). Crystallisation gave 21-acetoxy - 11β,17α-dihydroxy-6-fluoromethylpregna-1,4,6-triene-3,20-dione, $\lambda_{max.}^{EtOH}$ 255 mμ

(ε, 10,400) and 290 mμ (ε, 11,850).

Example 16.—17α-ethyl-6-fluoromethylpregna-4,6-diene-3,20-dione

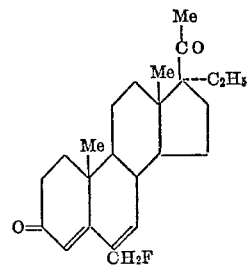

(a) Preparation of 17α-ethyl-6-formyl-3-methoxypregna-3,5 - dien - 20-one.—17α-ethyl-3-methoxypregna-3,5-dien-20-one (Weiss, Schaub, Allen, Poletto, Pidacks, Conrow & Coscia, Tetrahedron, 1964, 20, 357) (18 g.) in ethylene dichloride (150 ml.) was added to the complex prepared at 0° C. from dimethylformamide (18 ml.) in ethylenedichloride (65 ml.) and phosgene (12.5 g.) in ethylene dichloride (120 ml.), and the mixture was stirred and allowed to warm to room temperature over 3 hours. The resulting complex was hydrolyzed in aqueous methanol (150 ml., 90%) containing sodium acetate (25 g.) for 10 minutes. The product was isolated with ether and purified from acetone-hexane to give the 6-formyl derivative, $\lambda_{max.}^{EtOH}$ 220 mμ

(ε, 11,000) and 320 mμ (ε, 15,200).

(b) Preparation of 17α - ethyl - 6 - hydroxymethyl-3-methoxypregna-3,5-dien-20-one.—The foregoing 6-formyl derivative (5 g.) was added to a stirred suspension of lithium borohydride (0.5 g.) in anhydrous tetrahydrofuran (100 ml.). After 5 minutes, the mixture was poured into water. The product was isolated with ether, and purified from aqueous methanol containing a drop of pyridine to give 17α - ethyl - 6-hydroxymethyl-3-methoxypregna-3,5-dien-20-one, λ_max. 250 mμ (ε, 18,300).

(c) Preparation of 17α - ethyl-6-hydroxymethylpregna-4,6-diene-3,20-dione.—A solution of 2,3 - dichloro - 5,6-dicyano-1,4-benzoquinone (0.6 g.) in 7 ml. of 95% aqueous acetone (i.e. 95 vols. acetone and 5 vols. water) was added dropwise during two minutes to a stirred solution of the foregoing 6-hydroxymethyl-3-enolether (1 g.) in 100 ml. of 95% aqueous acetone. The mixture was stirred for a further 3 minutes, then filtered through a short column of alumina. Removal of the solvent gave a solid which was purified from aqueous methanol. 17α-ethyl-6-hydroxymethylpregna - 4,6 - diene-3,20-dione crystallised in needles, $\lambda_{max.}$ 284 mμ ($\epsilon$, 22,300).

(d) 17α-ethyl - 6 - fluoromethylpregna-4,6-diene-3,20-dione.—The foregoing 17α-ethyl-6-hydroxymethylpregna-4,6-diene-3,20-dione (400 mg.) in dry chloroform (2 ml.) at room temperature was treated with 2-chloro-1,1,2-trifluorotriethylamine (0.5 g.) added dropwise during 2 minutes. The mixture was allowed to stand for an hour, and the product, isolated with ether, was chromatographed on silica gel (20 g.). Material eluted with benzene-ether mixtures (8:1 to 1:1) was crystallised from ethanol to give 17α - ethyl-6-fluoromethylpregna - 4,6 - diene-3,20-dione, $\lambda_{max.}$ 278 mμ ($\epsilon$, 24,000).

Example 17

In a similar manner, 6-hydroxymethyl-3-oxo-4,6-dienic derivatives of the other starting materials listed above, prepared, for example, as disclosed in copending Application 457,522 filed May 20, 1965, now issued as Patent No. 3,375,167 or from their 3-enol ethers by the procedure set forth in Example 16 (a), (b) and (c), are converted to the corresponding 6-fluoromethyl derivatives. By this procedure there are prepared 17β-acetoxy- and 17β-hydroxy-2-methyl-6-fluoromethylandrosta-4,6-diene-3-one from 17β-acetoxy-2-methyl-6-hydroxymethylandrosta-4,6-dien-3-one;

17β-acetoxy and 17β-hydroxy-17α-methyl-6-fluoromethylandrosta-4,6-diene-3-one from 17β-acetoxy-17α-methyl-6-hydroxymethyl-androsta-4,6-dien-3-one;

17β-acetoxy-17α-methyl-6-fluoromethylandrosta-4,6,9(11) trien-3-one from 17β-acetoxy-17α-methyl-6-hydroxymethylandrosta-4,6,9(11)-triene-3-one;

17β-acetoxy-17α-(prop-1′-ynyl)-6-fluoromethylandrosta-4,6-dien-3-one from 17β-acetoxy-17α-(prop-1′-ynyl)-6-hydroxymethylandrosta-4,6-dien-3-one;

17β-acetoxy-17α-chlorethynyl-6-fluoromethylandrosta-4,6-diene-3-one from 17β-acetoxy-17α-chlorethynyl-6-hydroxymethylandrosta-4,6-dien-3-one;

17α-acetoxy-6-fluoromethyl-19-norpregna-4,6-diene-3,20-dione from 17α-acetoxy-6-hydroxymethyl-19-norpregna-4,6-diene-3,20-dione;

17α-acetoxy-6-fluoromethylpregna-4,6,9(11)-triene-3,20-dione from 17α-acetoxy-6-hydroxymethylpregna-4,6,9(11)-triene-3,20-dione;

17α-acetoxy-16α-methyl-6-fluoromethylpregna-4,6-diene-3,20-dione from 17α-acetoxy-16α-methyl-6-hydroxymethylpregna-4,6-diene-3,20-dione;

17α-acetoxy-16-chloromethylene-6-fluoromethylpregna-4,6-diene-3,20-dione from 17α-acetoxy-16-chloromethylene-6-hydroxymethylpregna-4,6-diene-3,20-dione;

17α-acetoxy-16-methylene-6-fluoromethylpregna-4,6,9(11)-triene-3,20-dione from 17α-acetoxy-16-methylene-6-hydroxymethylpregna-4,6,9(11)-triene-3,20-dione;

17α-acetoxy-16-ethylidene-6-fluoromethylpregna-4,6-diene-3,20-dione from 17α-acetoxy-16-ethylidene-6-hydroxymethylpregna-4,6-diene-3,20-dione;

21-acetoxy-17α-hydroxy-16α-methyl-6-fluoromethylpregna-4,6-diene-3,11,20-trione from 21-acetoxy-17α-hydroxy-16α-methyl-6-hydroxymethylpregna-4,6-diene-3,11,20-trione;

21-fluoro-17α-hydroxy-16α-methyl-6-fluoromethylpregna-4,6-diene-3,11,20-trione from 21-fluoro-17α-hydroxy-16α-methyl-6-hydroxymethylpregna-4,6-diene-3,11,20-trione;

21-acetoxy-17α-hydroxy-16α-chloro-6-fluoromethylpregna-4,6-diene-3,11,20-trione from 21-acetoxy-17α-hydroxy-16α-chloro-6-hydroxymethylpregna-4,6-diene-3,11,20-trione;

21-acetoxy-17α-hydroxy-16α-chloromethyl-6-fluoromethylpregna-4,6-diene-3,11,20-trione from 21-acetoxy-17α-hydroxy-16α-chloromethyl-6-hydroxymethylpregna-4,6-diene,3,11,20-trione;

21-acetoxy-17α-hydroxy-16-methylene-6-fluoromethylpregna-4,6-diene-3,11,20-trione from 21-acetoxy-17α-hydroxy-16-methylene-6-hydroxymethylpregna-4,6-diene-3,11,20-trione;

21-acetoxy-17α-hydroxy-16-chloromethylene-6-fluoromethylpregna-4,6-diene-3,11,20-trione from 21-acetoxy-17α-hydroxy-16-chloromethylene-6-hydroxymethylpregna-4,6-diene-3,11,20-trione;

21-acetoxy-16α,17α-isopropylidenedioxy-6-fluoromethylpregna-4,6-diene-3,11,20-trione from 21-acetoxy-16α,17α-isopropylidenedioxy-6-hydroxymethylpregna-4,6-diene-3,11,20-trione;

21-acetoxy-11β,17α-dihydroxy-9α-fluoro-6-fluoromethylpregna-4,6-diene-3,20-dione from 21-acetoxy-11β,17α-dihydroxy-9α-fluoro-6-hydroxymethylpregna-4,6-diene-3,20-dione;

21-acetoxy-11β,17α-dihydroxy-16-methyl-6-fluoromethylpregna-4,6-diene-3,20-dione from 21-acetoxy-11β,17α-dihydroxy-16-methyl-6-hydroxymethylpregna-4,6-diene-3,20-dione;

21-acetoxy-11β,17α-dihydroxy-16-methylene-6-fluoromethylpregna-4,6-diene-3,20-dione from 21-acetoxy-11β,17α-dihydroxy-16-methylene-6-hydroxymethylpregna-4,6-diene-3,20-dione;

21-acetoxy-11β-hydroxy-16α,17α-isopropylidenedioxy-6-fluoromethylpregna-4,6-diene-3,20-dione from 21-acetoxy-11β-hydroxy-16α,17α-isopropylidenedioxy-6-hydroxymethylpregna-4,6-diene-3,20-dione;

21-acetoxy-11β-hydroxy-9α-fluoro-16α,17α-isopropylidenedioxy-6-fluoromethylpregna-4,6-diene-3,20-dione from 21-acetoxy-11β-hydroxy-9α-fluoro-16α,17α-isopropylidenedioxy-6-hydroxymethylpregna-4,6-diene-3,20-dione;

21-acetoxy-17α-hydroxy-6-fluoromethylpregna-4,6,9(11)-triene-3,20-dione from 21-acetoxy-17α-hydroxy-6-hydroxymethylpregna-4,6,9(11)-triene-3,20-dione;

21-fluoro-16α,17α-isopropylidenedioxy-6-fluoromethylpregna-4,6,9(11)-triene-3,20-dione from 21-fluoro-16α,17α-isopropylidenedioxy-6-hydroxymethylpregna-4,6,9(11)-triene-3,20-dione;

21-fluoro-11β-hydroxy-16α,17α-isopropylidenedioxy-6-fluoromethylpregna-4,6-diene-3,20-dione from 21-fluoro-11b-hydroxy-16α,17α-isopropylidenedioxy-6-hydroxymethylpregna-4,6-diene-3,20-dione;

21-acetoxy-6-fluoromethylpregna-4,6,17(20)-triene-3,11-dione from 21-acetoxy-6-hydroxymethylpregna-4,6,17(20)-triene-3,11-dione;

3,11-dioxo-6-fluoromethylpregna-4,6,17-trien-21-oic acid ethyl ester from 3,11-dioxo-6-hydroxymethylpregna-4,6,17-trien-21-oic acid ethyl ester;

21-fluoro-17α-acetoxy-6-fluoromethylpregna-4,6-diene-3,20-dione from 21-fluoro-17α-acetoxy-6-hydroxymethylpregna-4,6-diene-3,20-dione;

6-fluoromethylpregna-4,6-diene-3,20-dione from 6-hydroxymethylpregna-4,6-diene-3,20-dione;

6-fluoromethylpregna-4,6-diene-3,11,20-trione from 6-hydroxymethylpregna-4,6-diene-3,11,20-trione;

16α,17β-diacetoxy-6-fluoromethylandrosta-4,6-dien-3-one from 16α-17β-diacetoxy-6-hydroxymethylandrosta-4,6-dien-3-one;

16-methyl-6-fluoromethylpregna-4,6,16-triene-3,20-dione from 16-methyl-6-hydroxymethylpregna-4,6,16-triene-3,20-dione;

16-cyano-6-fluoromethylpregna-4,6-diene-3,20-dione from 16-cyano-6-hydroxymethylpregna-4,6-diene-3,20-dione;

3-(3-oxo-6-fluoromethyl-17β-hydroxyandrosta-4,6-dien-17α-yl)propionic acid lactone from 3-(3-oxo-6-hydroxymethyl-17β-hydroxyandrosta-4,6-dien-17α-yl)-propionic acid lactone;

21-acetoxy-17α-hydroxy-16α-fluoro-6-fluoromethylpregna-4,6-diene-3,11,20-trione from 21-acetoxy-17α-hydroxy-16α-fluoro-6-hydroxymethylpregna-4,6-diene-3,11,20-trione.

We claim:

1. 6 - fluoromethyl-16α,17α-isopropylidenedioxypregna-4,6-diene-3,20-dione.

2. 17α - acetoxy - 6 - fluoromethyl - 16 - methylene-pregna-4,6-diene-3,20-dione.

References Cited

UNITED STATES PATENTS

| 3,056,807 | 10/1962 | Ayer | 260—397.3 |
| 3,189,604 | 6/1965 | Beal et al. | 260—239.55 |
| 3,239,541 | 3/1966 | Bowers et al. | 260—397.4 |
| 3,328,431 | 6/1967 | Bowers et al. | 260—397.3 |
| 3,341,560 | 9/1967 | Campbell et al. | 260—397.4 |
| 3,359,287 | 12/1967 | Babcock et al. | 260—397.4 |

LEWIS GOTTS, Primary Examiner.

ETHEL G. LOVE, Assistant Examiner.

U.S. Cl. X.R.

167—65, 74; 260—239.57, 343.2, 397.1, 397.3, 397.4, 397.45, 397.47